United States Patent [19]

Moulin

[11] Patent Number: 4,861,132
[45] Date of Patent: Aug. 29, 1989

[54] SELF-ALIGNING PRECISION GUIDE PIN

[75] Inventor: Norbert L. Moulin, Placentia, Calif.

[73] Assignee: Hughes Aircraft Company, Los Angeles, Calif.

[21] Appl. No.: 124,235

[22] Filed: Nov. 23, 1987

[51] Int. Cl.[4] .............................................. G02B 6/36
[52] U.S. Cl. ................... 350/96.20; 379/316; 439/669
[58] Field of Search ............... 350/96.18, 96.20, 96.21, 350/96.22; 379/316, 332; 439/668, 669

[56] References Cited

U.S. PATENT DOCUMENTS

| 464,519 | 12/1891 | Patterson | 439/188 |
| 467,901 | 1/1892 | Scribner | 379/316 X |
| 574,281 | 12/1896 | Scribner et al. | 439/669 |
| 592,380 | 10/1897 | Kellogg | 379/332 X |
| 1,552,227 | 9/1925 | Pacent | 439/669 |
| 1,720,653 | 7/1929 | Weston | 439/669 |
| 2,003,948 | 6/1935 | Mess | 439/381 |
| 2,277,326 | 3/1942 | Huss | 200/51 R |
| 2,815,494 | 12/1957 | Hutchings | 439/593 |
| 2,878,459 | 3/1959 | Barker | 439/669 X |
| 2,954,542 | 9/1960 | Wales | 439/252 |
| 3,758,189 | 9/1973 | Codrino | 350/96.20 |
| 4,303,301 | 12/1981 | Teichert et al. | 350/96.18 |
| 4,355,862 | 10/1982 | Kock | 350/96.20 |
| 4,477,146 | 10/1984 | Bowen et al. | 350/96.21 |
| 4,746,188 | 5/1988 | Löffler | 350/96.20 |

FOREIGN PATENT DOCUMENTS

| 2918024 | 11/1980 | Fed. Rep. of Germany | 350/96.20 |
| 52-49039 | 4/1977 | Japan | 350/96.20 |
| 131895 | 11/1919 | United Kingdom | 379/332 |

Primary Examiner—John D. Lee
Attorney, Agent, or Firm—Joseph E. Szabo

[57] ABSTRACT

A precision guide assembly (11) comprising a receptacle (13) having an at least part-cylindrical passage (19) with an axis (27), a guide pin (15) sized to be inserted into the passage (19) of the receptacle (13) and having an axis (31). The guide pin (15) has a part-spherical head (33) and an at least part-cylindrical stem (35) joined to the head by a neck (37). The stem (35) and head (33) have substantially the same diameter and a lesser diameter than the diameter of the passage (19) so that the guide pin (15) can be slid into the passage (19). The neck (37) has a cross-sectional dimension less than the diameter of the stem (35) and an inclined surface (39) which is inclined with respect to the axis (31) of the guide pin (15) so that the inclined surface (39) extends radially inwardly as it extends distally.

3 Claims, 1 Drawing Sheet

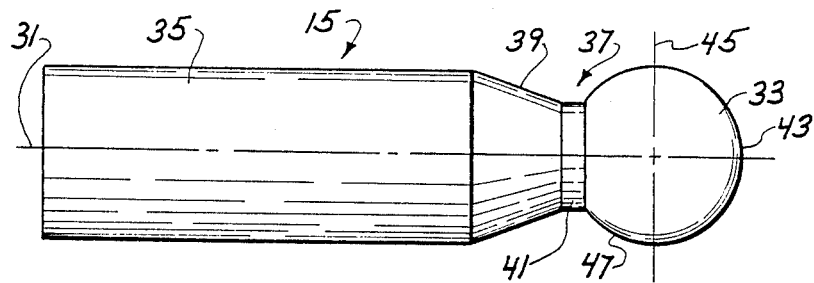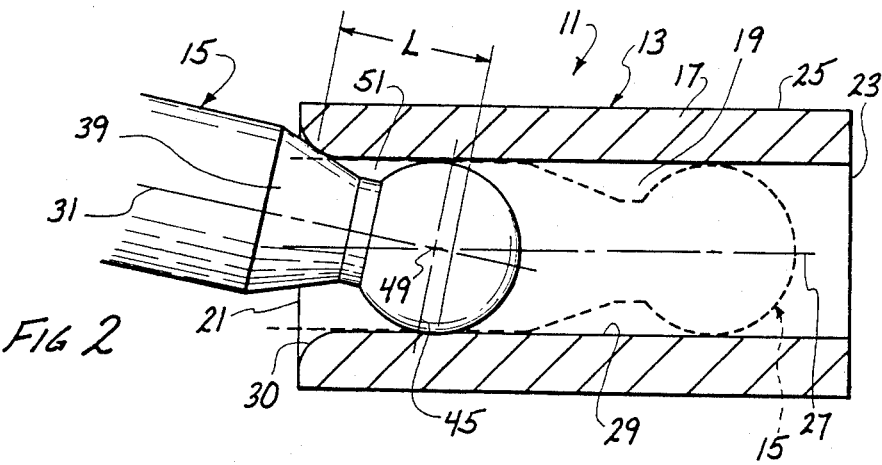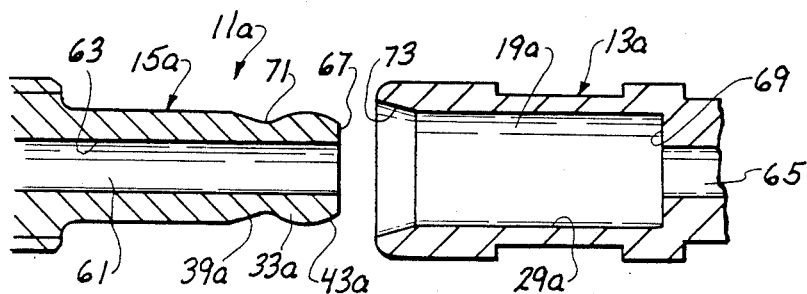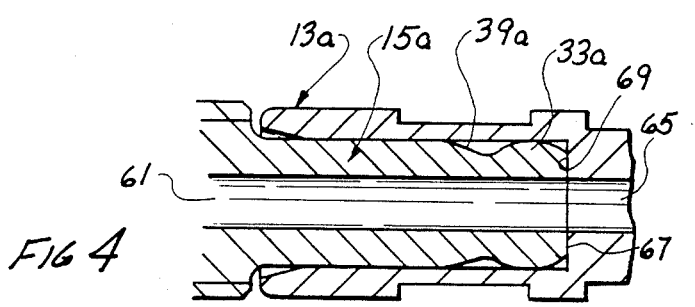

SELF-ALIGNING PRECISION GUIDE PIN

BACKGROUND OF THE INVENTION

1. Field of the Invention

This invention relates to a precision guide assembly for precisely guiding components into the desired alignment.

2. Description of Related Art

It is often necessary to insert a guide pin into the passage of a receptacle. If the cross section of passage is considerably larger than the guide pin, this insertion task is quite easy. However, for applications requiring precision alignment, the clearance between the passage of the receptacle and the guide pin may be very small, and this makes the insertion task much more difficult. The insertion task is further encumbered if it must be accomplished blindly, i.e., without looking at the receptacle and the guide pin.

The need for precision alignment occurs in many different environments. For example, in the case of an optical connector, it may be necessary to accurately align a light conductor carried by the guide pin with a light conductor carried by the receptacle. Similarly, alignment tasks of this sort may also occur for electrical connectors, pneumatic connectors, liquid connectors and in various machine shop applications, such as in certain die sets.

Conventional techniques used to assist insertion of a guide pin into the passage of a receptacle typically include enlarging the region of the passage adjacent the opening. This enlarging of the passage may be obtained, for example, with a chamfer or relatively large radius. Enlarging the opening of the passage can make it easier to get the distal tip of the guide pin into the opening of the passage. However, this does not align the axis of the guide pin with the axis of the passage of the receptacle, and accordingly, full insertion of the guide pin into the passage of the receptacle is not facilitated with this technique.

SUMMARY OF THE INVENTION

This invention greatly facilitates the insertion of a guide pin into the passage of a receptacle even when the insertion task must be carried out blindly. More specifically, this invention solves the problems discussed above relating to misalignment of the axes of the guide pin and the passage of the receptacle. With this invention, misalignment of the axes is used to bring about relative rotation of the guide pin and the receptacle to bring the axes into substantial alignment to thereby allow completion of the insertion process.

To solve the misalignment problem, first and second sets of cooperating surfaces on the guide pin and the receptacle are used to advantage. The first set of cooperating surfaces is responsive to partial insertion of the guide pin into the passage for causing the axes of the guide pin and the passage to substantially intersect at a location. This location is the pivot point or region about which relative rotation of the guide pin and receptacle occurs to bring about the desired axial alignment. By first obtaining intersection, or substantial intersection, of the axes of the guide pin and the passage, it is possible to bring about alignment of these axes by relative rotation of the guide pin and the receptacle. Of course, due to tolerances, the axes may not actually intersect, but for precision applications, these axes should nearly or substantially intersect.

A second important function of the first set of cooperating surfaces is that they must allow some relative rotation of the guide pin and the receptacle generally about the location. To allow the rotation, the first set of surfaces preferably includes an at least part-spherical surface on the guide pin and a surface defining the passage of the receptacle which will allow the part-spherical surface to rotate in the passage. Although the configuration of the passage could be any shape that will permit this, a cylindrical shape is preferred. The configuration of the passage may also be part cylindrical in the sense that the effect of a cylinder can be obtained through the use of cylindrical segments or sectors arranged around the guide pin.

The first set of cooperating surfaces must also be configured to provide space in which the relative rotation can occur. This is preferably accomplished by reducing the cross-sectional dimensions of the guide pin in a zone so that the first set of cooperating surfaces defines a gap circumscribing a region of the guide pin. This gap allows the relative rotation of the guide pin and receptacle to occur when the guide pin is partially inserted into the passage.

The second set of cooperating surfaces on the guide pin and receptacle bring about the desired relative rotation between the guide pin and the receptacle. The second set of cooperating surfaces is responsive to misalignment of the axes and to further insertion of the guide pin into the passage for relatively rotating the guide pin and the receptacle to bring the axes into substantial alignment. This allows completion of the insertion of the guide pin into the passage.

The second set of surfaces preferably includes an inclined surface on the guide pin which is inclined with respect to the axis of the guide pin so that the inclined surface extends radially inwardly as it extends distally. When so configured, there is a lever arm created about the center of rotation which automatically brings about the relative rotation between the guide pin and the receptacle which aligns the axes.

The second set of cooperating surfaces also preferably includes a surface f the receptacle adjacent the opening of the receptacle. This latter surface is engaged by the inclined surface to form the lever arm.

In a preferred embodiment, the inclined surface also reduces the cross-sectional dimensions of the guide pin in at least a portion of the zone. Consequently, the inclined surface also forms a portion of the first set of cooperating surfaces in that it assists in performing one important function of the first set of cooperating surfaces.

The part-spherical surface of the guide pin can also be used to reduce the cross-sectional dimensions of the guide pin in the zone. In this regard, the part-spherical surface has a diametral plane perpendicular to the axis of the guide pin, and the part-spherical surface extends proximally of the diametral plane to reduce the cross-sectional dimensions of the guide pin in a portion of the zone. The part-spherical surface should also extend distally of the diametral plane.

Viewed from a different perspective, the guide pin has a part-spherical head and an at least part-cylindrical stem joined to the head by a neck. The stem and head have substantially the same diameter, and a lesser diameter than the diameter of the passage of the receptacle so that the guide pin can be slid into the passage. The neck has a cross-sectional dimension less than the diameter of the stem, and the inclined surface discussed above is on the neck. To facilitate machining, the neck preferably, although not necessarily, includes a cylindrical surface between the part-spherical surface of the head and the inclined surface.

The guide pin and receptacle can be used in virtually any application where alignment and, in particular precision alignment, is required. For example, the guide pin may have a distal end and a longitudinal passage opening at the distal end of the guide pin. With this construction, the passage of the guide pin can be brought into communication with the receptacle, and if desired, these passages can be aligned or bear a predetermined relationship with respect to each other. These passages may carry, for example, a fluid or a gas or conductors for electrical or optical energy. Of course, the passage in the guide pin can be eliminated for many applications, such as machine shop applications, where the alignment of parts being worked upon, fixtures, die sets, etc. are to be aligned.

The invention, together with additional features and advantages thereof, may best be understood by reference to the following description taken in connection with the accompanying illustrative drawing.

BRIEF DESCRIPTION OF THE DRAWING

In the accompanying drawings:

FIG. 1 is a side elevational view of one form of guide pin constructed in accordance with the teachings of this invention.

FIG. 2 is a fragmentary sectional view illustrating the insertion of the guide pin into a receptacle.

FIGS. 3 and 4 are sectional views through a second embodiment of guide assembly of this invention showing the pin and receptacle separate and with the pin fully inserted into the receptacle, respectively. In this embodiment, the invention is applied to an optical connector.

DESCRIPTION OF THE PREFERRED EMBODIMENTS

Referring now to the drawings in more detail, FIG. 2 shows a precision guide assembly 11 which includes a receptacle 13 and a guide pin 15. The receptacle 13 has a peripheral wall 17 and an axial passage 19 with openings 21 and 23 at an outer surface 25. The passage 19 has an axis 27, and in this embodiment, the passage 19 is defined by a cylindrical surface 29 and a surface or large radius 30 at and adjacent the opening 21.

The configuration of the outer surface 25 is not important, and the opening 23 can be closed, if desired. The receptacle 13 and the guide pin 15 can be constructed of any suitable material, such as a metal, plastic or ceramic, and in the embodiment illustrated, they are constructed of metal.

The guide pin 15 is sized to be inserted into the passage 19 of the receptacle 13. The guide pin has a longitudinal central axis 31.

The guide pin 15 has a part-spherical head 33, a cylindrical stem 35 and a neck 37 joining the stem to the head. The head 33 and the stem 35 have substantially the same diameter and a lesser diameter than the diameter of the passage 19 of the receptacle 13 so that the guide pin 15 can be slid into the passage 19. Although the clearance between the guide pin 15 and the cylindrical surface 29 can vary with different applications, the clearance between the guide pin and the passage stated as a percent of the diameter of the pin may be, for example, 0.0006 percent. Of course, the less the clearance, the more difficult it is to insert the guide pin 15 into the passage 19.

The neck 37 defines a zone in which the cross-sectional dimensions of the guide pin are reduced. The neck 37 has a cross-sectional dimension less than the diameter of the stem 35 and an inclined surface 39 which is inclined with respect to the axis 31 so that it extends radially inwardly as it extends distally, i.e., toward the head 33. In this embodiment, the inclined surface 39 is frusto-conical; however, other configurations can be employed.

The neck 37 also has a cylindrical surface 41 between the head 33 and the inclined surface 39. The cylindrical surface 41 facilitates machining in that it provides a cylindrical region between the part-spherical head 33 and the inclined surface 39. The cylindrical surface 41 can be eliminated, if desired.

In this embodiment, the head 33 has a part-spherical surface 43 which is formed by a sphere which is truncated by the cylindrical surface 41. The spherical surface 43 has a diametral plane 45 perpendicular to the axis 31. The spherical surface 43 extends proximally of the diametral plane 45, i.e., toward the cylindrical surface 41, to define a proximal region 47 of the part-spherical surface 43 and to reduce the cross-sectional dimension of the guide pin 15. Accordingly, the neck 37 may be considered as comprising the inclined surface 39, the cylindrical surface 41 and the proximal region 47 of the spherical surface 43. The spherical surface 43 also extends distally of the diametral plane, i.e., away from the cylindrical surface 41.

In use of the guide assembly 11, the guide pin 15 is manually partially inserted into the passage 19 to the position shown by way of example in FIG. 2. In this position, the head 33 and part of the neck 37 are within the passage 19, and the inclined surface 39 is engageable with the radius 30. Because it is easy to insert a partial sphere, such as the head 33, into a correspondingly shaped passage, such as the passage 19, the partial insertion of the guide pin into the passage is easily accomplished. Although the radius 30 serves as a lead-in to the passage 19, it is not required. In fact, the primary benefit of the radius 30 is to reduce wear by increasing the bearing area with the guide pin 15.

When partially inserted, a first set of cooperating surfaces on the receptacle 13 and the guide pin 15 cause the axes 27 and 31 to substantially intersect at a location 49 as shown in FIG. 2. This is a result of the spherical surface 43 being within the cylindrical passage 19, with the spherical surface being of only slightly smaller diameter than the cylindrical surface 29. Thus, the first set of cooperating surfaces includes the cylindrical surface 29 and the part-spherical surface 43.

In addition, the first set of cooperating surfaces allows some relative rotation of the guide pin 15 and the receptacle 13 generally about the location 49. The location 49, in this embodiment, is substantially coincident with the center of the spherical surface 43 and lies substantially on the axis 27. More specifically, the first set of cooperating surfaces allows this relative rotation because of their configuration and because the cross-sectional dimensions of the guide pin 15 are reduced in a zone, i.e., at the neck 37, so that this first set of cooperating surfaces defines a gap 51 circumscribing a region of the guide pin. The gap 51 allows some initial misalignment between the axes 27 and 31 and also allows relative rotation between the receptacle 13 and the guide pin 15 when the guide pin is partially inserted into the passage 19. Accordingly, the first set of cooperating surfaces also includes a portion of the neck 37. Specifically, the first set of cooperating surfaces includes the proximal region 47, the cylindrical surface 41 and a portion of the inclined surface 39.

A second set of cooperating surfaces on the receptacle 13 and the guide pin 15 is responsive to misalignment of the axes 27 and 31 and to further insertion of the guide pin 15 into the passage 19 for relatively rotating the guide pin and the receptacle generally about the location 49 to bring the axes into substantial alignment and to allow completion of the insertion of the guide pin into the passage. More specifically, the inclined surface 39 engages the radius 30 as shown in FIG. 2 to create a lever arm which has a length L and which extends from about the point of contact of the head 33 and the cylindrical surface 29 at the bottom of the head to the point of contact between the inclined surface 39 and the radius 30 as shown in FIG. 2. As the guide pin 15 is moved farther into the passage 19, this lever arm tends to rotate the guide pin 15 with respect to the receptacle 13 to bring the axes 27 and 31 into alignment and to permit the insertion of the guide pin into the passage as shown in dashed lines in FIG. 2. Of course, the location 49 moves farther into the passage 19 as the guide pin 15 is advanced farther into the passage. However, this location 49 still marks the intersection of the axes 27 and 31. Thus, in this embodiment, the second set of cooperating surfaces includes the inclined surface 39 and the radius 30.

In the embodiment of FIGS. 1 and 2, the guide pin 15 has no axial passage. However, the guide pin 15 and the receptacle 13 may be connected to other structure which it is desired to accurately align.

FIGS. 3 and 4 show a guide assembly 11a which is identical to the guide assembly 11 in all respects not shown or described herein. Portions of the guide assembly 11a corresponding to portions of the guide assembly 11 are designated by corresponding reference numerals followed by the letter "a."

The primary difference between the guide assemblies 11 and 11a is that the latter is in the form of an optical connector, and as such, the guide pin 15a carries a light conductor 61 in an axial passage 63, and the receptacle 13a carries a light conductor 65 in the passage 19a. More specifically, the passage 63 opens at a planar distal end 67, and the light conductor 61 which may be, for example, an optical fiber, terminates flush with the distal end 67. Similarly, the light conductor 65, which may also be an optical fiber, terminates flush with a shoulder 69 within the passage 19a.

The head 33a and the spherical surface 43a are truncated by the distal end 67, and the cylindrical surface 41 is replaced with a radiused surface 71 which smoothly blends the part-spherical surface 43a into the inclined surface 39a.

With respect to the receptacle 13a, the radius 30 is replaced with chamfer 73, and the passage 19a has a region of reduced diameter for carrying the light conductor 65. In addition, both the receptacle 13a and the guide pin 15a may include other structure and characteristics of an optical connector.

The guide assembly 11a functions in the same manner as described above for the guide assembly 11. When the guide pin 15a is fully inserted into the passage 19a, the distal end 67 abuts the shoulder 69 (FIG. 4), and the light conductors 61 and 65 are in coaxial abutting relationship as shown in FIG. 4. The components may be retained in the position of FIG. 4 with other structure (not shown), and the light conductors 61 and 65 may be retained in closely spaced rather than abutting relationship.

Although exemplary embodiments of the invention have been shown and described, many changes, modifications and substitutions may be made by one having ordinary skill in the art without necessarily departing from the spirit and scope of this invention.

What is claimed is:

1. A precision guide assembly comprising:
   a receptacle having an at least part-cylindrical passage and an outer surface, said passage having an axis and an opening at the outer surface;
   a guide pin sized to be inserted into the passage of the receptacle and having an axis;
   said guide pin having a head with a part-spherical surface and an at least part-cylindrical stem joined to the head by a neck;
   said part-spherical surface extending proximally and distally from a diameteral plane perpendicular to the axis of the guide pin;
   said stem and said part-spherical surface of said head having substantially the same diameter and a lesser diameter than the diameter of the passage so that the guide pin can be slid into the passage;
   said neck having a cross-sectional dimension less than the diameter of the stem and an inclined surface which is inclined with respect to the axis of the guide pin so that the inclined surface extends radially inwardly as it extends distally; and
   wherein the clearance between said passage and said stem is less than 0.001 percent of the diameter of said stem.

2. A precision guide assembly comprising:
   a receptacle having an at least part-cylindrical passage and an outer surface, said passage having an axis and an opening at the outer surface;
   a guide pin sized to be inserted into the passage of the receptacle and having an axis;
   said guide pin having a head with a part-spherical surface and an at least part-cylindrical stem joined to the head by a neck;
   said part-spherical surface extending proximally and distally from a diametrical plane perpendicular to the axis of the guide pin;
   said stem and said part-spherical surface of said head having substantially the same diameter and a lesser diameter than the diameter of the passage so that the guide pin can be slid into the passage;
   said neck having a cross-sectional dimension less than the diameter of the stem and an inclined surface which is inclined with respect to the axis of the guide pin so that the inclined surface extends radially inwardly as it extends distally; and
   wherein the clearance between said passage and said stem is approximately 0.0006 percent of the diameter of said stem.

3. A precision guide assembly comprising:
   a receptacle having an at least part-cylindrical passage and an outer surface, said passage having an axis and an opening at the outer surface;
   a guide pin sized to be inserted into the passage of the receptacle and having an axis;

said guide pin having a head with a part-spherical surface and an at least part-cylindrical stem joined to the head by a neck;

said part-spherical surface extending proximally and distally from a diametral plane perpendicular to the axis of the guide pin;

said stem and said part-spherical surface of said head having substantially the same diameter and a lesser diameter than the diameter of the passage so that the guide pin can be slid into the passage;

said neck having a cross-sectional dimension less than the diameter of the stem and an inclined surface which is inclined with respect to the axis of the guide pin so that the inclined surface extends radially inwardly as it extends distally; and said neck including a cylindrical surface between the part-spherical surface and the inclined surface.

* * * * *